(No Model.)
G. B. DEARDORFF & C. E. KREITER.
FLOAT FOR FRUIT CANS.
No. 590,389.   Patented Sept. 21, 1897.
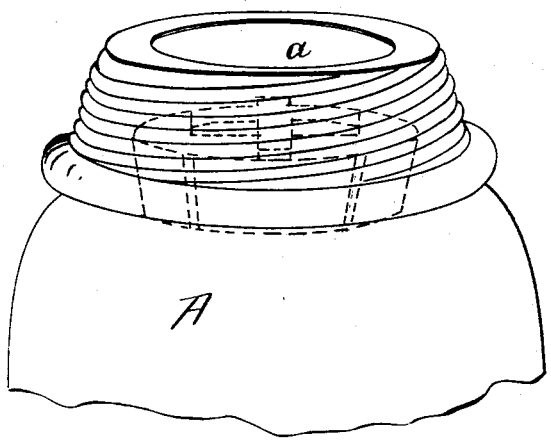
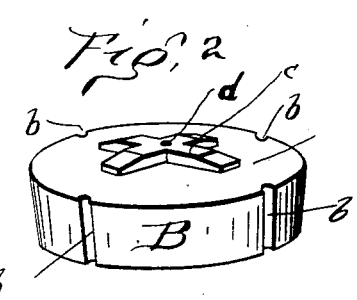
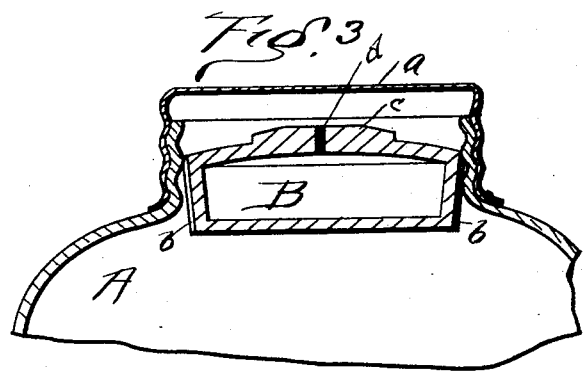
WITNESSES
C. J. Cross.
Bertha Pinvch.
INVENTORS
George B. Deardorff
Clarence E. Kreiter
By Judd W. Bond
Atty.

UNITED STATES PATENT OFFICE.

GEORGE B. DEARDORFF AND CLARENCE E. KREITER, OF CANAL DOVER, OHIO; SAID KREITER ASSIGNOR TO SAID DEARDORFF.

FLOAT FOR FRUIT-CANS.

SPECIFICATION forming part of Letters Patent No. 590,389, dated September 21, 1897.

Application filed May 17, 1897. Serial No. 636,855. (No model.)

*To all whom it may concern:*

Be it known that we, GEORGE B. DEARDORFF and CLARENCE E. KREITER, citizens of the United States, residing at Canal Dover, in the county of Tuscarawas and State of Ohio, have invented certain new and useful Improvements in Floats for Fruit-Cans; and we do hereby declare that the following is a full, clear, and exact description of the same, reference being had to the annexed drawings, making a part of this specification, and to the letters of reference marked thereon, in which—

Figure 1 is a view showing the top of a can and illustrating the position of the float in dotted lines. Fig. 2 is a detached view of the float. Fig. 3 is a vertical section.

The object of the present invention is to provide a means for preventing the fruit contained in a can from molding and at the same time provide a float that will be lasting or one that can be used until it becomes broken. The float is formed substantially of the same diameter as the inner diameter of the neck of the fruit can or jar, and is preferably formed tapering, so that it can be easily entered into the neck of the can or jar and seated upon the top of the fruit contained in the can or jar.

In the accompanying drawings, A represents the can or jar, which is provided with the ordinary cover $a$, which cover may be of any desired kind or style, inasmuch as the cover and can form no particular part of the present invention, except that in order to carry out the purposes of our invention, it being understood that some kind of can and cover must be employed.

The float B is formed of glass or porcelain or like material, and, as shown, it is formed hollow for the purpose of producing a float that will be light and at the same time have the desired amount of size to be conveniently handled and have the desired amount of strength.

For the purpose of allowing the air contained in the fruit and in the can to find its way to the upper side of the float said float is provided with the grooves $b$, which grooves are located upon the periphery of the float. It will be understood that after the air has found its way to the top of the float it will be contained between the float and the cover, thereby preventing the formation of mold or the growth of fungi.

For the purpose of providing a means for placing the float in proper position and removing the same the ridges or bars $c$ may be provided, and are located substantially as shown in Fig. 2. For the purpose of preventing the float from breaking in case it is placed in position while the fruit is hot an opening such as $d$ may be formed in the top or upper side of the float.

Having fully described our invention, what we claim as new, and desire to secure by Letters Patent, is—

As an improved article of manufacture a float for fruit-cans formed hollow and provided with vertical grooves upon its periphery, and ridges or bars located upon the upper side thereof, and an opening leading into the hollow chamber of the float, substantially as and for the purpose specified.

In testimony that we claim the above we have hereunto subscribed our names in the presence of two witnesses.

GEORGE B. DEARDORFF.
    CLARENCE E. KREITER.

Witnesses:
 DAVID A. MUNCEY,
 JOHN E. ENCK.